US 12,172,368 B2

(12) United States Patent
Lane et al.

(10) Patent No.: US 12,172,368 B2
(45) Date of Patent: Dec. 24, 2024

(54) STRUCTURAL TUBE ELEMENT FABRICATOR

(71) Applicant: NORTHROP GRUMMAN SYSTEMS CORPORATION, Falls Church, VA (US)

(72) Inventors: Chesley Lane, Hawthorne, CA (US); Steven J. Floyd, Monterey Park, CA (US); Talbot P. Thrasher, Coatesville, PA (US); Timothy R. Stone, Torrance, CA (US); Vernon M. Benson, Morgan, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 183 days.

(21) Appl. No.: 18/162,152

(22) Filed: Jan. 31, 2023

(65) Prior Publication Data

US 2024/0253299 A1 Aug. 1, 2024

(51) Int. Cl.
*B29C 64/147* (2017.01)
*B29C 64/188* (2017.01)
(Continued)

(52) U.S. Cl.
CPC .......... *B29C 64/147* (2017.08); *B29C 64/188* (2017.08); *B29C 64/205* (2017.08);
(Continued)

(58) Field of Classification Search
CPC ... B29C 53/581; B29C 53/582; B29C 53/583; B29C 52/60; B29C 52/607; B29C 53/68; B29C 53/825; B29C 64/147; B29C 64/188; B29C 64/205; B29C 65/08; B29C 66/1122; B29C 66/43; B29C 66/432; B29C 66/49; B29C 66/69; B29C 66/72141;
(Continued)

(56) References Cited

U.S. PATENT DOCUMENTS 4,237,662 A * 12/1980 Kinzler .................. B64G 99/00
  52/745.2
6,443,352 B1 9/2002 White
(Continued)

FOREIGN PATENT DOCUMENTS

EP 3165450 A1 5/2017

*Primary Examiner* — Philip C Tucker
*Assistant Examiner* — Brian R Slawski
(74) *Attorney, Agent, or Firm* — John A. Miller; Shumaker, Loop & Kendrick, LLP

(57) ABSTRACT

A machine for manufacturing tube elements comprised of tape strips. The machine includes a shaft, a disk mounted to one end of the shaft, a motor coupled to an opposite end of the shaft, and a plate mounted to the shaft. The plate includes a plurality of spools mounted to the plate, where a separate one of the strips is wound on each spool. In one embodiment, the machine further includes a rail positioned adjacent to the disk, a slide slidably secured to the rail and including an end support configured to hold ends of the tape strips, and an indexer configured to pull the slide on the rail away from the disk. The tape strips are unwound from the spools when the indexer pulls the slide in a manner so that the tape strips ride in a spaced apart manner around the disk to form the tube element.

20 Claims, 5 Drawing Sheets

(51) Int. Cl.
  *B29C 64/205* (2017.01)
  *B29K 307/04* (2006.01)
  *B29K 309/08* (2006.01)
  *B33Y 10/00* (2015.01)
  *B33Y 30/00* (2015.01)
  *B33Y 40/00* (2020.01)

(52) U.S. Cl.
  CPC ...... *B29K 2307/04* (2013.01); *B29K 2309/08* (2013.01); *B33Y 10/00* (2014.12); *B33Y 30/00* (2014.12); *B33Y 40/00* (2014.12)

(58) Field of Classification Search
  CPC ........ B29C 66/73921; B29C 66/81419; B29C 70/32; B29C 70/388; B29K 2307/04; B29K 2309/08; B29L 2031/3097; B33Y 10/00; B33Y 30/00; B33Y 40/00; B64G 1/22; B64G 99/00
  USPC ....... 156/60, 73.1, 73.2, 184, 191, 195, 250, 156/269, 270, 292, 296, 308.2, 324, 349, 156/425, 426, 433, 436, 443, 446, 448, 156/510, 516, 538, 539, 543, 556, 559
  See application file for complete search history.

(56) References Cited

U.S. PATENT DOCUMENTS

| | | |
|---|---|---|
| 6,457,629 B1 | 10/2002 | White |
| 6,463,349 B2 | 10/2002 | White et al. |
| 6,519,500 B1 | 2/2003 | White |
| 6,685,365 B2 | 2/2004 | White |
| 6,814,823 B1 | 11/2004 | White |
| 2001/0039700 A1 | 11/2001 | Krueger |
| 2005/0115186 A1 | 6/2005 | Jensen et al. |
| 2013/0291709 A1 | 11/2013 | Woods et al. |
| 2018/0142726 A1 | 5/2018 | Slesinski |
| 2019/0063642 A1 | 2/2019 | Ehsani |

* cited by examiner

STRUCTURAL TUBE ELEMENT FABRICATOR

BACKGROUND

Field

This disclosure relates generally to a system and method for manufacturing structural tube elements and, more particularly, to a system and method for manufacturing structural tube elements on-orbit for spacecraft components using additive manufacturing techniques.

Discussion of the Related Art

It has been proposed in the art to manufacture spacecraft parts, and even spacecraft themselves, in space or on-orbit. Spacecraft parts that are manufactured on-orbit or in space do not require the strong structures required by spacecraft parts produced and manufactured on Earth to survive launch into space, and thus can be very lightweight. The manufacture of spacecraft parts in space would likely employ additive manufacturing techniques. A typical additive manufacturing technique uses a feedstock material, such as a continuous filament from a spool, provided to a heated nozzle, where it is extruded therefrom as a heated molten filament to be deposited as adjacent rows of strips to form a layer, and where the molten filaments (fiber reinforced or unreinforced) immediately begin to harden once they are extruded from the nozzle. Multiple layers are built up in this manner in a certain configuration to produce a desired part. These filaments may have continuous carbon, or other, fibers that extend from one end of the filament to the other end of the filament and are encapsulated in a suitable polymer, such as a thermoplastic, to provide the desired matrix strength. Additionally, the carbon fibers can be chopped or sectioned so that they are not continuous from one end of the filament to the other end of the filament, and are also impregnated/held together with a suitable matrix.

Tube elements are employed as truss structures in a variety of large spacecraft components, such as antennas, telescopes, solar arrays, etc., as building block elements for those structures. The current state of the art for in-space manufacturing of tube elements includes planned NASA missions to manufacture polymer tubes for on-orbit servicing, assembly and manufacturing (OSAM) missions. These tube elements do not contain continuous fiber reinforcement and hence have low stiffness and a high coefficient of thermal expansion. These OSAM manufacturing approaches also manufacture components layer-by-layer, which is an inherently slow process. Tube elements from these state of the art manufacturing approaches cannot provide the stiffness and stability required for super structures, and manufacturing the thousands of meters of tube would require years of on-orbit construction with a single machine or hundreds of machines. Other on-orbit construction technology concepts are known in the art, but are limited by tooling constraints (scalability), speed, mass and/or thermal expansion.

SUMMARY

The following discussion discloses and describes a system and method for manufacturing structural tube elements on-orbit using additive manufacturing techniques, where the tube elements include wound tape strips. The system includes a machine having a shaft, a disk mounted to one end of the shaft, a motor coupled to the opposite end of the shaft through a gear assembly, and a plate mounted to the shaft and being rotated therewith. The plate includes a plurality of spools mounted to and disposed around the plate, where a separate one of the strips is wound on each spool. In one embodiment, the machine further includes a rail positioned adjacent to the disk and extending from the shaft in the same direction, a slide slidably secured to the rail and including an end support configured to hold ends of the tape strips, and an indexer configured to pull the slide on the rail away from the disk. However, in other embodiments, the spools can be motor-driven to eliminate the length constraint imposed by the rail. The tape strips are unwound from the spools when the indexer pulls the slide in a manner so that the tape strips ride in a spaced apart manner around the disk to form the tube element.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for manufacturing structural tube elements on-orbit using additive manufacturing techniques is merely exemplary in nature, and is in no way intended to limit the disclosure or its applications or uses.

As will be discussed in detail below, this disclosure proposes a structural tube element fabricator (STEF) manufacturing system that is capable of rapidly producing low-mass truss or tube elements with integral end fittings on-orbit. The system uses continuous carbon fiber thermoplastic feedstock and ultrasonic welding to manufacture the ultra-light structural tube elements. Multiple spools of material create a continuous counter-winding helical lattice wrap through simultaneously winding in two directions along with longitudinal tows fed directly. A rotary mechanism provides ultrasonic spot welding to fuse overlaps in material tows, resulting in short or very long tube elements as desired, where the tube elements can be manufactured in approximately 30-60 seconds per meter.

Figure 1:
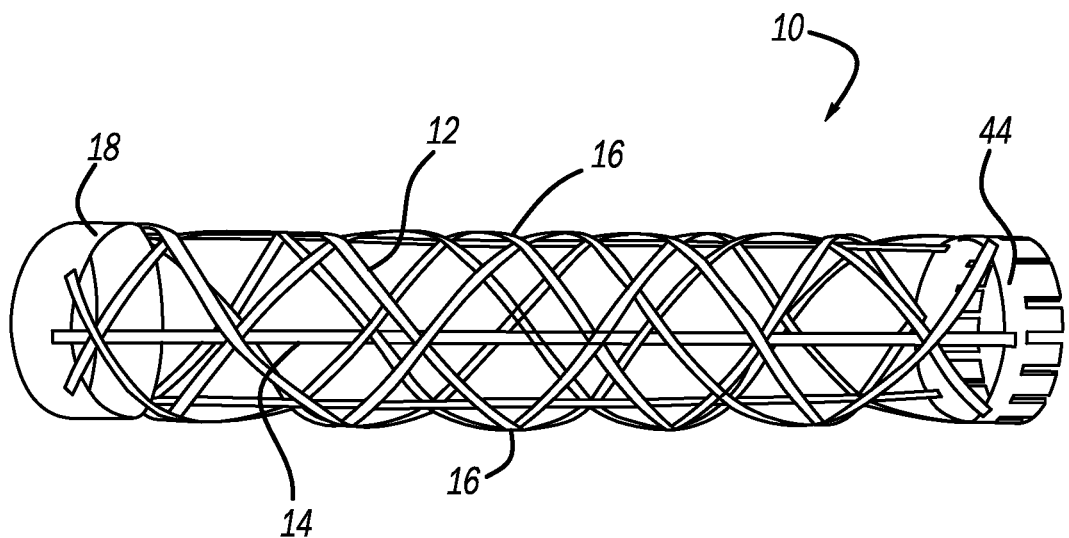
FIG. 1 is an isometric view of a tube element.

FIG. 1 is an isometric view of a tube element 10 that has been manufactured by a process and machine of the type referred to above and that will discussed in detail below. The tube element 10 includes a number of helically wound tape strips 12 made of a thermoplastic material including continuous carbon fibers. A series of straight tape strips 14 also made of a thermoplastic material including continuous glass or carbon fibers are disposed around the element 10. The strips 12 and 14 cross at a number of locations 16 where they are ultrasonically welded together. One end of the tape strips 12 and 14 are secured or welded to a socket end fitting 18 and the opposite end of the tape strips 12 and 14 are secured or welded to a cup end fitting 44, which will be discussed in detail below. In this non-limiting embodiment, there are three clockwise wrapped tape strips 12, three counter-clockwise wrapped tape strips 12 and three straight tape strips 14 incremented 120° apart. Further, the tube element 10 is 0.80 meters long and has an inner diameter of 10 cm and the tape strips 12 and 14 are about 60 mm wide and 0.25 mm in thickness. However, it is stressed that these parameters are by way of a non-limiting example.

Figure 2:
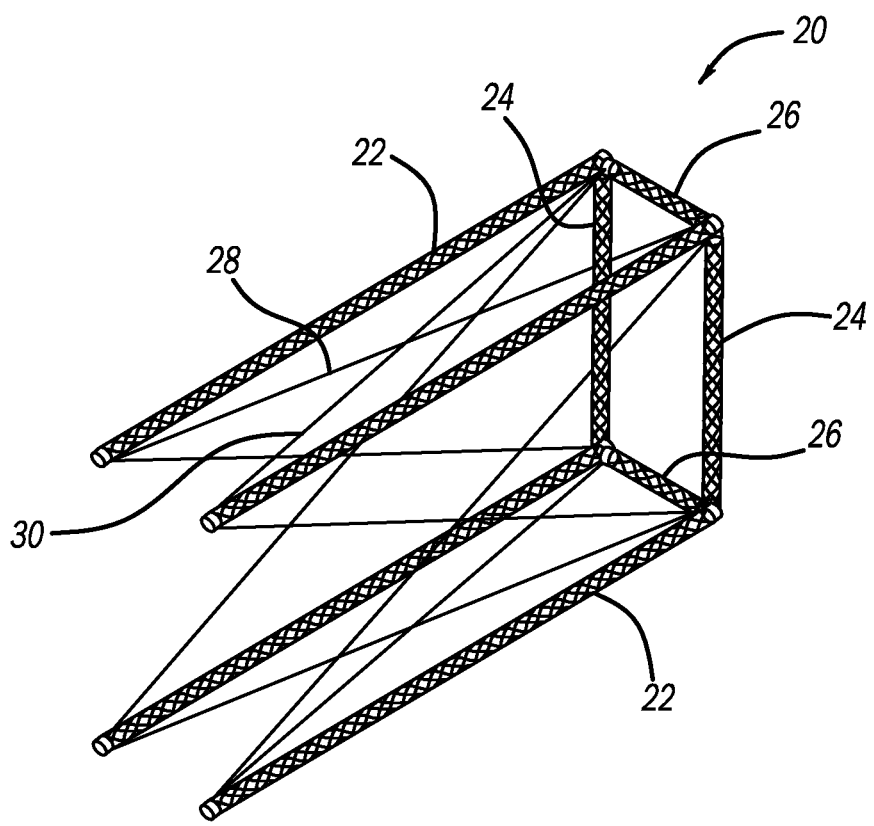
FIG. 2 is an isometric view of a box structure made up of eight of the tube elements shown in FIG. 1.

The end fittings 18 can be configured to adequately secure several of the tube elements 10 together to form, for example, box structures that then are attached to together to form large structures. FIG. 2 is an isometric view of an exemplary box structure 20 including eight of the tube elements 10, specifically four long longitudinal tube elements 22, two end tube elements 24 of one length and two end tube elements 26 of a shorter length, where the tube elements 24 and 26 define a rectangle. Two cross bars 28 and 30 provide support for each pair of adjacent longitudinal tube elements 22, as shown.

Figure 3:
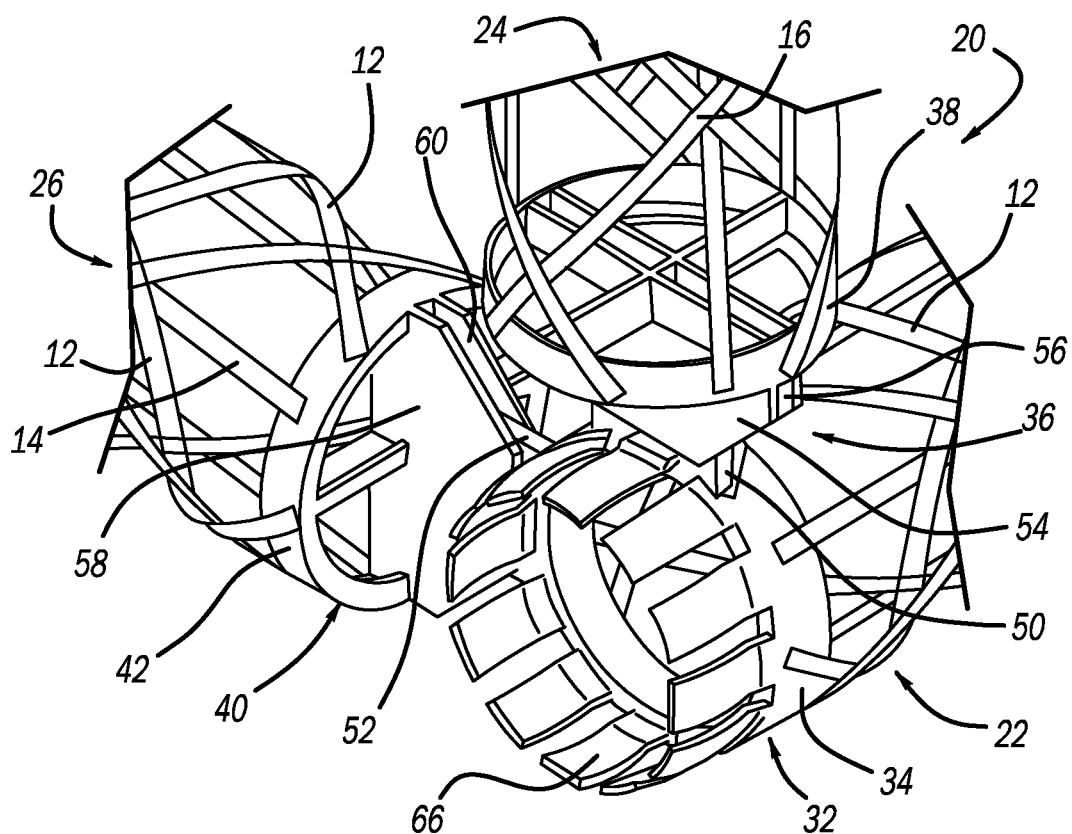
FIG. 3 is a broken-away isometric view of the box structure shown in FIG. 2 illustrating a corner connection between the tube elements.
Figure 4:
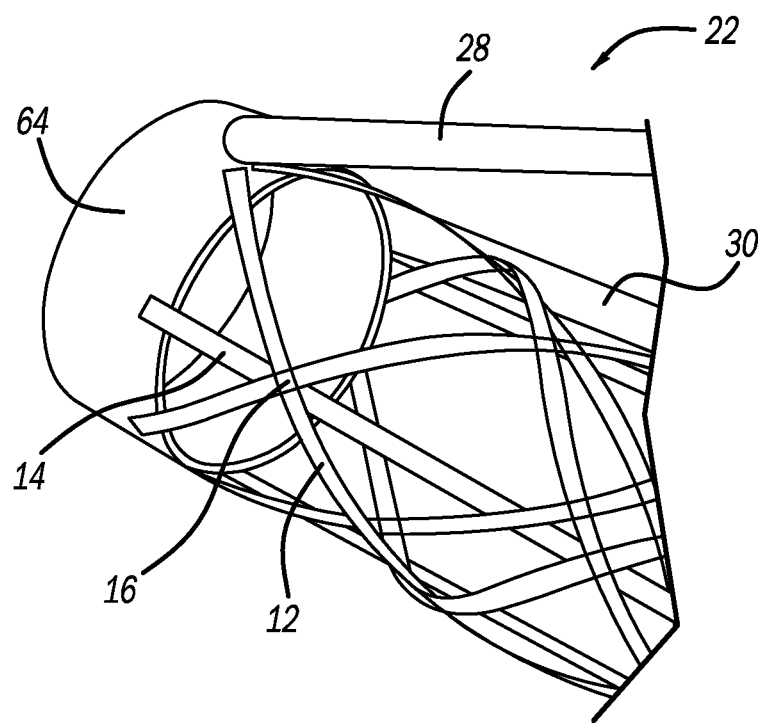
FIG. 4 is a broken-away isometric view of one of the tube elements in the box structure in FIG. 2 including a cup end fitting.

The end fittings that allow the tube elements 22, 24 and 26 to be secured together may have various configurations. FIG. 3 is a broken-away isometric view of the box structure 20 showing how an end of one of the tube elements 22, one of the tube elements 24 and one of the tube elements 26 are joined as one example. Particularly, the tube element 22 includes a socket end fitting 32 having a ring 34, the tube element 24 includes a clevis end fitting 36 having a ring 38 and the tube element 26 includes a clevis end fitting 40 having a ring 42, where ends of the strips 12 and 14 are ultrasonically welded to the rings 34, 38 and 42. The socket end fitting 32 includes tabs 50 and 52 coupled to the ring 34 at 90° relative to each other, the clevis end fitting 36 includes opposing tabs 54 and 56 coupled to the ring 38 and the clevis end fitting 40 includes opposing tabs 58 and 60 coupled to the ring 42. The tab 50 is positioned between the tabs 54 and 56 and the tab 52 is positioned between the tabs 58 and 60, and ultrasonically welded thereto. As shown in FIG. 4, an opposite end of the longitudinal tube elements 22 includes a cup end fitting 64 that accepts the cross bar 28 or 30. The fitting 32 includes a series of spaced apart flexible tangs 66 concentric with and extending from the ring 34, where the cup end fitting of the same type as the cup end fitting 64 on an adjacent longitudinal tube element can be slid onto the tangs 66 and welded thereto.

Figure 5:
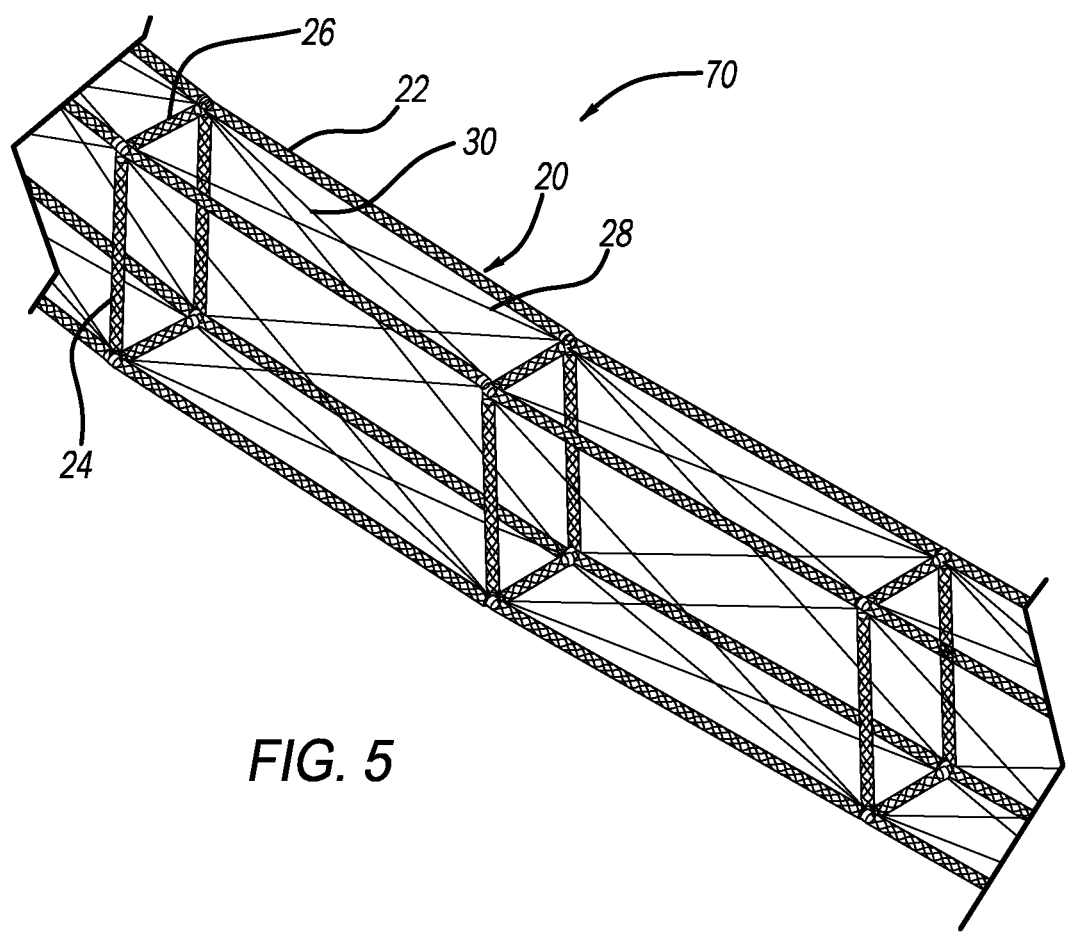
FIG. 5 is a broken-away isometric view of a support structure showing a number of the box structures shown in FIG. 2 coupled together.
Figure 6:
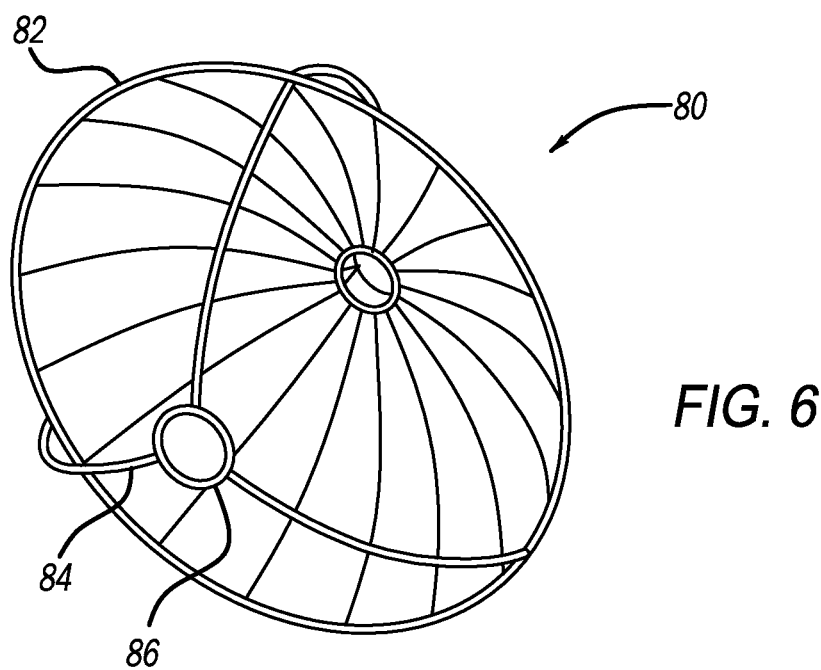
FIG. 6 is an isometric view of an RF antenna that includes a number of the support structures shown in FIG. 5.

Multiple of the box structures 20 are connected together end-to-end by any suitable manner to form the large structure. FIG. 5 is a broken-away isometric view of a support structure 70 showing a number of the box structures 20 coupled together. Multiple support structures 70 are then used to assemble a large spacecraft component. FIG. 6 is an isometric view of an RF antenna 80 showing one example of such a spacecraft component, where an outer ring 82 of the antenna 80 is composed of the support structure 70 and arms 84 that support a transceiver 86 are also composed of the support structure 70.

Figure 7:
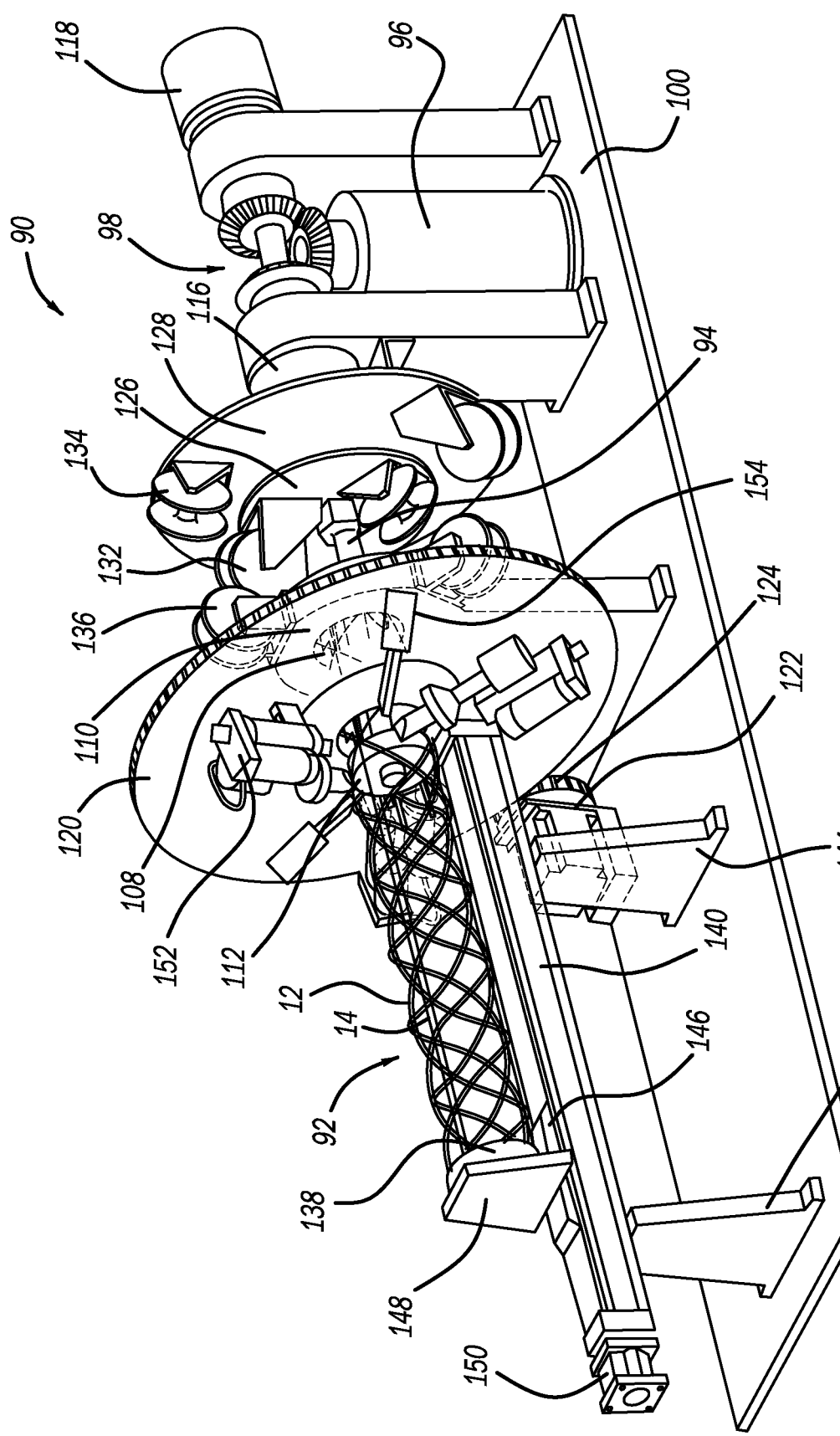
FIG. 7 is an isometric view of an additive manufacturing machine for manufacturing the tube elements.
Figure 8:
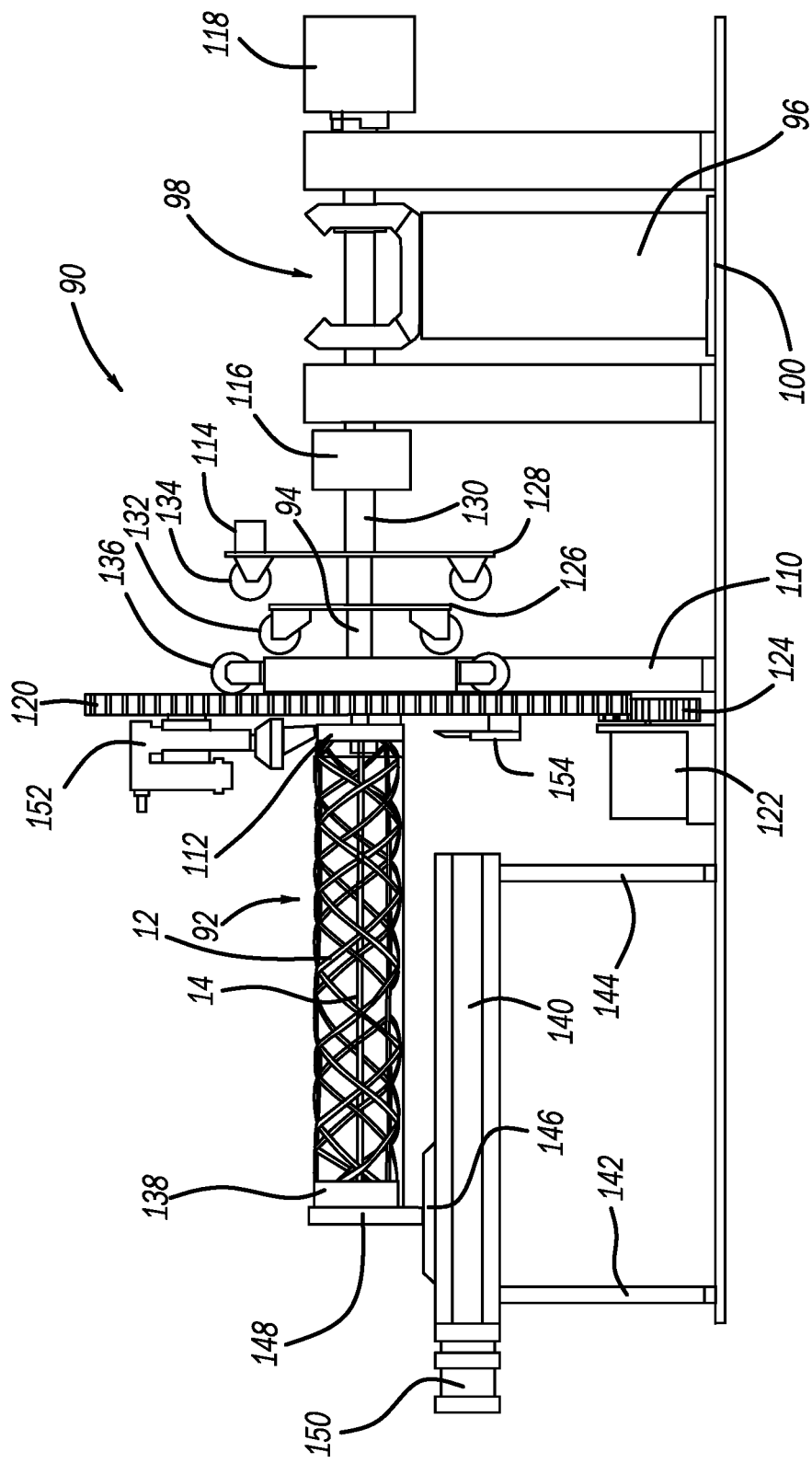
FIG. 8 is a side view of the machine shown in FIG. 7.

As mentioned above, the tube elements 10 are manufactured on-orbit by an additive manufacturing process to produce lightweight and strong elements for assembling the components as discussed above. Various additive manufacturing machines and assemblies can be employed to do that. FIG. 7 is an isometric view and FIG. 8 is a side view of an additive manufacturing machine 90 suitable for this purpose showing a tube element 92 being manufactured, where the tube element 92 includes the tape strips 12 and 14 that make up the tube element 10. The machine 90 includes a shaft 94 that is rotated by a stepper motor 96 through beveled gears 98 at one end, where the motor 96 is mounted to a base plate 100. The shaft 94 extends through an opening 108 in a support member 110 mounted to the base plate 100, where a disk 112 is secured to the shaft 94 at an opposite end from the stepper motor 96 on an opposite side of the support member 110, as shown. A gear plate 120 is mounted to the support member 110 opposite to the stepper motor 96 and adjacent to the disk 112, where a motor 122 and gear 124 rotate the plate 120. A small diameter disk 126 is secured to the shaft 94 and a large diameter disk 128 positioned adjacent to the disk 126 is secured to a concentric shaft 130 so that when the stepper motor 96 operates the beveled gears 98 rotate the disks 126 and 128 in opposite directions. Three equally spaced spools 132 at 120° relative to each other are mounted to the disk 126 facing the support member 110 and three equally spaced spools 134 at 120° relative to each other are mounted to the disk 128 facing the member 110, where one of the tape strips 12 is wound on each of the spools 132 and 134. Three equally spaced spools 136 are mounted on an outer edge of the support member 110, where one of the tape strips 14 is wound on each of the spools 136.

A rail 140 is secured to the support member 110 and mounted to the base plate 100 by stands 142 and 144. A slide 146 is slidably positioned on the rail 140 and an end support 148 is mounted to the slide 146 to which a tube member end fitting 138 is secured. An indexer 150 pulls the slide 146 away from the support member 110 as the tube member 92 is being fabricated. However, the rail 140 limits the length of the tube element 92. Therefore, in an alternate embodiment, the rail 140 is eliminated and instead of using the indexer 150 to pull the slide 146, the spools 132, 134 and 136 can be rotated by a motor to dispense the strips 12 and 14. This embodiment is represented by a motor 114 mounted to the disk 128 for rotating one of the spools 134. Each of the spools 132, 134 and 136 would include its own suitably mounted motor. Slip ring assemblies 116 and 118 are provided to feed the motors. Three welding devices 152 are circumferentially mounted to the plate 120 adjacent to the disk 112 and three cutters 154 are circumferentially mounted to the plate 120 between the welding devices 152 adjacent to the disk 112.

The tapes 12 and 14 are threaded through suitable guides (not shown) and the opening 108 in a proper spaced apart configuration around the disk 112 and are welded to the end fitting 138 secured to the end support 148. The indexer 150 pulls the slide 146 and thus the tapes 12 and 14 off of the spools 132, 134 and 136 and the motor 96 rotates the shaft 94 so that three of the tapes 12 are would around the disk 112 in a spaced apart manner in one helical direction and the other three tapes 12 are wound around the disk 112 in a spaced apart manner in the opposite helical direction. Further, the tapes 14 are drawn straight in a spaced apart manner. At periodic times, the two tapes 12 being wound in opposite directions and the tapes 14 will cross at three locations on the disk 112. At this time, the rotation of the shaft 94 and the indexer 150 stops, and the welding devices 152 are rotated to the proper location by the plate 120 to weld the three tapes 12 and 14 together at the three locations. The rotation of the shaft 94 and the indexing then continues until the next time the tapes 12 and 14 cross and the welding devices 152 weld the three tapes 12 and 14 at the three locations. This continues until the desired length of the tube element 92 is reached, and the cutters 154 cut all of the tapes 12 and 14. The other end fitting is then attached to the tube element 92.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A machine for manufacturing a tube element including spaced apart tape strips, said machine comprising:
    a first shaft extending in a direction and including a first end and a second end;
    a disk mounted to the first end of the first shaft;
    a motor coupled to the second end of the first shaft through a gear assembly, said motor operable to rotate the first shaft; and
    a first plate mounted to the first shaft and being rotated therewith, said first plate including a plurality of spools mounted to and disposed around the first plate, wherein a separate one of the strips is wound on each spool, said plurality of spools being rotated in a manner so that the tape strips ride in a spaced apart manner around the disk to form the tube element.

2. The machine according to claim 1 further comprising a rail positioned adjacent to the disk and extending from the first shaft in the same direction, a slide slidably secured to the rail and including an end support configured to hold ends of the tape strips, and an indexer configured to pull the slide on the rail away from the disk, wherein the tape strips are unwound from the spools when the indexer pulls the slide.

3. The machine according to claim 2 further comprising a second shaft concentric with the first shaft, said motor coupled to the second shaft through the gear assembly and being operable to rotate the second shaft, said machine further comprising a second plate mounted to the second shaft adjacent to the first plate and being rotated with the second shaft, said second plate including a plurality of spools mounted to and disposed around the second plate, wherein a separate one of the strips is wound on each spool on the second plate, and wherein the tape strips are unwound from the spools on the second plate when the indexer pulls the slide in a manner so that the tape strips ride in a spaced apart manner around the disk to form the tube element.

4. The machine according to claim 3 wherein the motor rotates the first and second shafts in opposite directions so that the tape strips that are unwound from the spools on the first plate are wound on the tube element in one helical direction and the tape strips that are unwound from the spools on the second plate are wound on the tube element in an opposite helical direction.

5. The machine according to claim 4 further comprising a support member including an opening, said first shaft extending through the opening so that the disk is on an opposite side of the support member from the motor, said support member including a plurality of spools mounted to and disposed around the support member, wherein a separate one of the strips is wound on each spool on the support member, and wherein the tape strips are unwound from the spools on the support member in a straight manner when the indexer pulls the slide in a manner so that the tape strips ride in a spaced apart manner around the disk to form the tube element.

6. The machine according to claim 5 wherein the tape strips are unwound from the spools on the first plate, the second plate, and the support member so that some of the tape strips periodically cross each other on the disk, said machine further comprising a third plate positioned proximate to the disk, said third plate including a plurality of ultrasonic welders disposed around the disk and being operable to weld the strips together at locations where the strips cross.

7. The machine according to claim 5 wherein the first plate includes three spools, the second plate includes three spools and the support member includes three spools.

8. The machine according to claim 1 wherein the plurality of spools are motorized so as to unwind the tape strips from the spools.

9. The machine according to claim 1 wherein the tape strips are unwound from the spools so that some of the tape strips periodically cross each other on the disk.

10. The machine according to claim 9 further comprising a plurality of ultrasonic welders disposed around the disk and being operable to weld the strips together at locations where the strips cross.

11. The machine according to claim 1 further comprising a plurality of cutters for cutting the tape strips.

12. The machine according to claim 1 wherein the tape strips are made of a thermoplastic matrix including glass or carbon fibers.

13. A machine for manufacturing a tube element including spaced apart tape strips, said machine comprising:
    a first shaft extending in a direction and including a first end and a second end;
    a disk mounted to the first shaft;
    a second shaft concentric with the first shaft;
    a motor coupled to the first and second shafts through a gear assembly, said motor operable to rotate the first and second shafts in opposite directions;
    a first plate mounted to the first shaft and being rotated therewith, said first plate including a plurality of spools mounted to and disposed around the first plate, wherein a separate one of the strips is wound on each spool;
    a second plate mounted to the second shaft and being rotated therewith, said second plate including a plurality of spools mounted to and disposed around the second plate, wherein a separate one of the strips is wound on each spool on the second plate;
    a support member including an opening, said first shaft extending through the opening so that the disk is on an opposite side of the support member from the motor, said support member including a plurality of spools mounted to and disposed around the support member, wherein a separate one of the strips is wound on each spool on the support member, and wherein the tape strips are unwound from all of the spools so that some of the tape strips periodically cross each other on the disk;
    a third plate positioned proximate to the disk, said third plate being rotatable and including a plurality of ultrasonic welders disposed around the disk and being operable to weld the strips together at locations where the strips cross;
    a rail positioned adjacent to the disk and extending from the first shaft in the same direction;
    a slide slidably secured to the rail and including an end support configured to hold ends of the tape strips; and an indexer configured to pull the slide on the rail away from the disk, wherein the tape strips that are unwound from the spools on the first plate are wound on the tube element in one helical direction, the tape strips that are unwound from the spools on the second plate are wound on the tube element in an opposite helical direction and the tape strips are unwound from the spools on the support member in a straight manner.

14. The machine according to claim 13 wherein the first plate includes three spools, the second plate includes three spools and the support member includes three spools.

15. The machine according to claim 13 further comprising a plurality of cutters for cutting the tape strips.

16. A method for manufacturing a tube element including spaced apart tape strips, said method comprising:
providing a first plate including a plurality of spools mounted to and disposed around the first plate, wherein a separate one of the strips is wound on each spool;
providing a second plate including a plurality of spools mounted to and disposed around the second plate, wherein a separate one of the strips is wound on each spool on the second plate;
rotating the first and second plates in opposite directions;
unwinding the tape strips from the spools as the plates are being rotated;
directing the unwound tape strips to a disk in a manner so that the strips being unwound from the spools on the first plate wind helically in one direction on the disk and the strips being unwound from the spools on the second plate wind helically in an opposite direction on the disk so that the strips from the spools on the first and second plates periodically cross on the disk; and
welding the strips together at locations on the disk where the strips cross.

17. The method according to claim 16 further comprising providing a support member including a plurality of spools mounted to and disposed around the support member, wherein a separate one of the strips is wound on each spool, and wherein directing the unwound tape strips to a disk includes directing the tape strips from the spools on the support member to the disk in a straight manner and welding the strips together includes welding the tape strips from the spools on the support member to the other strips at the locations where the strips cross.

18. The method according to claim 17 wherein the first plate includes three spools, the second plate includes three spools and the support member includes three spools.

19. The method according to claim 16 further comprising cutting the tape strips to provide the tube element.

20. The method according to claim 16 wherein the tape strips are made of a thermoplastic matrix including glass or carbon fibers.

* * * * *